United States Patent [19]

Kurabayashi

[11] Patent Number: 5,787,382
[45] Date of Patent: Jul. 28, 1998

[54] NAVIGATION APPARATUS FOR DISPLAYING A MAP BY LIMIT INFORMATION

[75] Inventor: Atsushi Kurabayashi, Kanagawa, Japan

[73] Assignee: Sony Corporation, Tokyo, Japan

[21] Appl. No.: 650,772

[22] Filed: May 20, 1996

[30] Foreign Application Priority Data

May 29, 1995 [JP] Japan .................... 7-130870

[51] Int. Cl.$^6$ .................................. G06F 165/00
[52] U.S. Cl. .................. 701/214; 701/211; 701/209; 701/28; 701/25
[58] Field of Search .................. 701/208, 209, 701/210, 211, 214, 23, 25, 26, 28; 340/988, 995, 996

[56] References Cited

U.S. PATENT DOCUMENTS

| | | | |
|---|---|---|---|
| 4,513,377 | 4/1985 | Hasebe et al. | 364/449.2 |
| 5,031,104 | 7/1991 | Ikeda et al. | 364/449.3 |
| 5,243,528 | 9/1993 | Lefebvre | 364/449.5 |
| 5,315,298 | 5/1994 | Morita | 340/995 |
| 5,414,629 | 5/1995 | Inoue | 364/449.4 |
| 5,459,667 | 10/1995 | Odagaki et al. | 364/449.3 |
| 5,552,990 | 9/1996 | Ihara et al. | 364/449.2 |
| 5,565,874 | 10/1996 | Rode | 340/995 |
| 5,592,389 | 1/1997 | La Rue et al. | 364/449.5 |
| 5,638,280 | 6/1997 | Nishimura et al. | 364/449.4 |
| 5,652,706 | 7/1997 | Morimoto et al. | 364/449.4 |

*Primary Examiner*—Vincent N. Trans
*Attorney, Agent, or Firm*—Jay H. Maioli

[57] ABSTRACT

A navigation apparatus includes a road data memory (16) for storing therein road data of position and shape data at every road, a road map making device (14) for making road map data by reading road data of a predetermined scope from the memory device (16), a route selecting device (14) for selecting a route on a road indicated by road map data for destination, and a video signal generating device (17) for generating a video signal for displaying a road map under the condition that symbols indicating the route selected by the route selecting device (14) are superimposed upon the road map data made by the road map making device (14), wherein shape data of minor roads existing at an intersecting point of roads are used as road data stored in the memory (16). The navigation apparatus can display a route at a crossing of complicated shape more accurately in conformity with the actual route.

14 Claims, 7 Drawing Sheets

| LINK NUMBER | NODE NUMBER TO BE CONNECTED | SHAPE DATA |
|---|---|---|
| L1 | N1 → N2 | ------------- |
| L2 | N2 → N3 | ------------- |
| L112 | N12 → N3 | ------------- |

| MINOR ROAD LINK NUMBER | ENTRANCE GATEWAY LINK NUMBER OF MINOR ROAD LINK | COORDINATE DATA (LONGITUDE AND LATITUDE DATA) | ROAD TYPE OF ENTRANCE GATEWAY LINK |
|---|---|---|---|
| | EXIT GATEWAY LINK NUMBER OF MINOR ROAD LINK | COORDINATE DATA (LONGITUDE AND LATITUDE DATA) | ROAD TYPE OF EXIT GATEWAY LINK |

FIG. 9

| TYPE OF DATA | LINK SHAPE DATA |
|---|---|
| MINOR ROAD ENTRANCE GATEWAY LINK | (DATA FROM UPSTREAM POINT TO MINOR ROAD INTERSECTING POINT) |
| MINOR ROAD LINK | (DATA FROM UPSTREAM POINT TO DOWNSTREAM POINT OF MINOR ROAD) |
| MINOR ROAD EXIT GATEWAY LINK | (DATA FROM MINOR ROAD INTERSECTING POINT TO DOWNSTREAM POINT) |

FIG. 10

NAVIGATION APPARATUS FOR DISPLAYING A MAP BY LIMIT INFORMATION

FIELD OF THE INVENTION

The present invention relates to a navigation apparatus for navigating a navigation object such as an automobile and a display method applicable to such navigation apparatus.

BACKGROUND OF THE INVENTION

A variety of navigation apparatus for navigation objects such as a car have heretofore been developed. A typical navigation apparatus comprises a mass storage data memory means such as a CD-ROM (compact disk-read-only memory) with road map data, for example, stored therein, a present position detecting means for detecting a present position, and a display device for displaying a road map covering the area near the detected present position based on data read out from the mass storage data memory means. The present position detecting means may be either a positioning system using an artificial satellite, which is generally referred to as a GPS (global positioning system), or a self-contained navigation system for tracking a change of the present position from a start point based on information of direction and speed in and at which a car is running.

As road map data stored in the memory means such as a CD-ROM, there is known principal road network data composed of only principal road (principal road such as freeway, national highway or prefectural highway) data. Since the navigation apparatus has the road map data has such principal road network data, the navigation apparatus can display a route to go with ease. Specifically, when a driver sets a coordinate position of a destination on this navigation apparatus, the driver can select a road with the shortest distance and time from roads indicated by road network information of principal road as a route from the present position (or other start point) to the destination. Then, the navigation apparatus displays the road thus selected on the road map as the route to go.

The principal road network information which is used to select the route to go is generally defined as shape data covering a crossing to a crossing of roads. Since the selected route is set on a road indicated by the principal road network information, in the case of a gateway of a freeway or a large-scale crossing such as a multi-level crossing, it is unavoidable that the navigation apparatus selects a position distant from a position of an actual road as a route to go.

Figure 1:
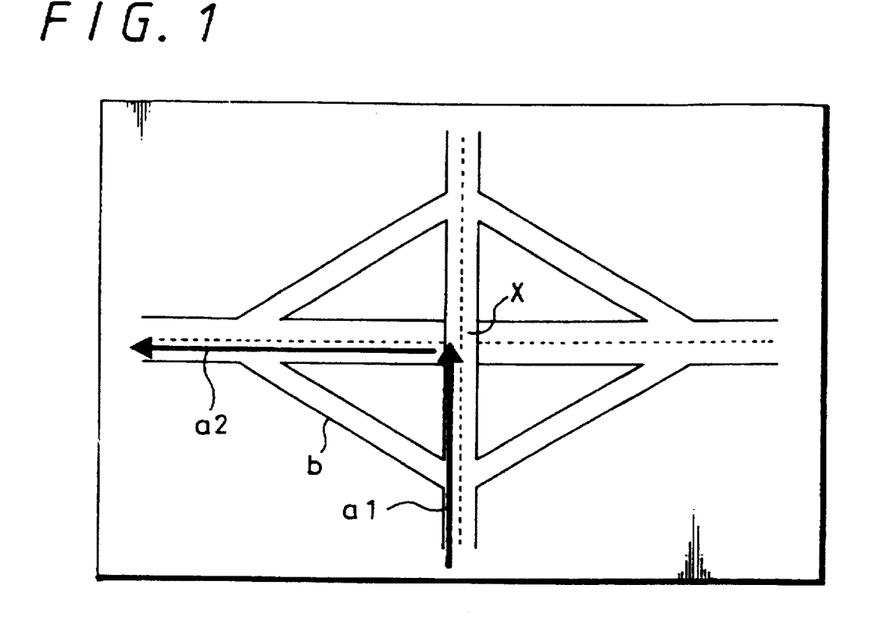
FIG. 1 is a schematic diagram used to explain a manner in which a route is displayed by a navigation apparatus.

As shown in FIG. 1, for example, when a route from a certain road a1 to a road a2 underpassing the road a1 is selected, a change of route at an intersecting point x of the two roads a1, a2 is displayed by arrows. In actual practice, although the roads a1, a2 are connected by a minor road b, the navigation apparatus displays the road map as if the driver could make a left-turn at the intersecting point x to change the road a1 to the road a2. Thus, if the driver selected the minor road b, the driver could make a left-turn to the road a2. There is then the possibility that the driver will select a wrong route to go.

As a road map displayed on a display unit of the navigation apparatus, a road map is formed based on detailed road information other than the above principal road network information. Accordingly, the above-mentioned minor road b itself is generally displayed on the road map.

SUMMARY OF THE INVENTION

In view of the aforesaid aspect, it is an object of the present invention to provide a navigation apparatus in which a route to go at a crossing can be displayed more accurately in conformity with an actual route to go.

According to an aspect of the present invention, there is provided a navigation apparatus for navigating a navigation object which is comprised of a road data memory having shape data of crossing, a map making means for making a map from road data, a route guide means for making a route to go, and a positioning means for positioning a present position.

According to another aspect of the present invention, there is provided a computer readable medium storing data for a computer for causing a computer to make an image of a map. The computer readable medium storing data is comprised of road data including several road positions, and shape data of crossing including a shape point of a plurality of road crossings.

According to still another aspect of the present invention, there is provided a car which is comprised of a body for making a shape of a car, wheels for rounding a car, and a navigation apparatus for navigating a car comprising a road data memory means having shape data of crossing, a map making means for making a map from road data, a route guide means for making a route to go, and a positioning means for positioning a present position.

According to a further aspect of the present invention, there is provided a car which is comprised of a body for making a shape of a car, wheels for rounding a car, and a navigation apparatus for navigating a car comprising a road data memory means having shape data of a crossing, a map making means for making a map from road data, a route guide means for making a route to go based on the shape data of crossing, a positioning means for positioning a present position, and a display signal generating means for generating a display signal.

In accordance with a yet further aspect of the present invention, there is provided a navigation method of navigating a navigation object which is comprised of the steps of a road data reading step for reading road data and shape data of a crossing from a road data memory, a map making step for making a map from the road data, a route guiding step for making a route based on the shape data of a crossing, a positioning step for positioning a present position, and a display signal generating step for generating a display signal.

In accordance with a yet further aspect of the present invention, there is provided a road display signal generating apparatus for generating a signal for displaying a road. This road display signal generating apparatus is comprised of a road data memory having shape data of a crossing, a map making means for making a map from road data, and a route guide means for making a route to go.

In accordance with a still further aspect of the present invention, there is provided a road display apparatus for displaying a road which is comprised of a road data memory means having shape data of a crossing, a map making means for making a map from road data, a route guide means for making a route to go, and a display means for displaying a map and a route made by the map making means and the route guide means, respectively.

In accordance with a still further aspect of the present invention, there is provided a computer apparatus for generating a signal for displaying a road which is comprised of a road data memory means having shape data of a crossing, a map making means for making a map from road data, and a route guide means for making a route to go.

DETAILED DESCRIPTION OF THE PREFERRED EMBODIMENT

The present invention will be described with reference to FIGS. 2 through 11.

Figure 2:
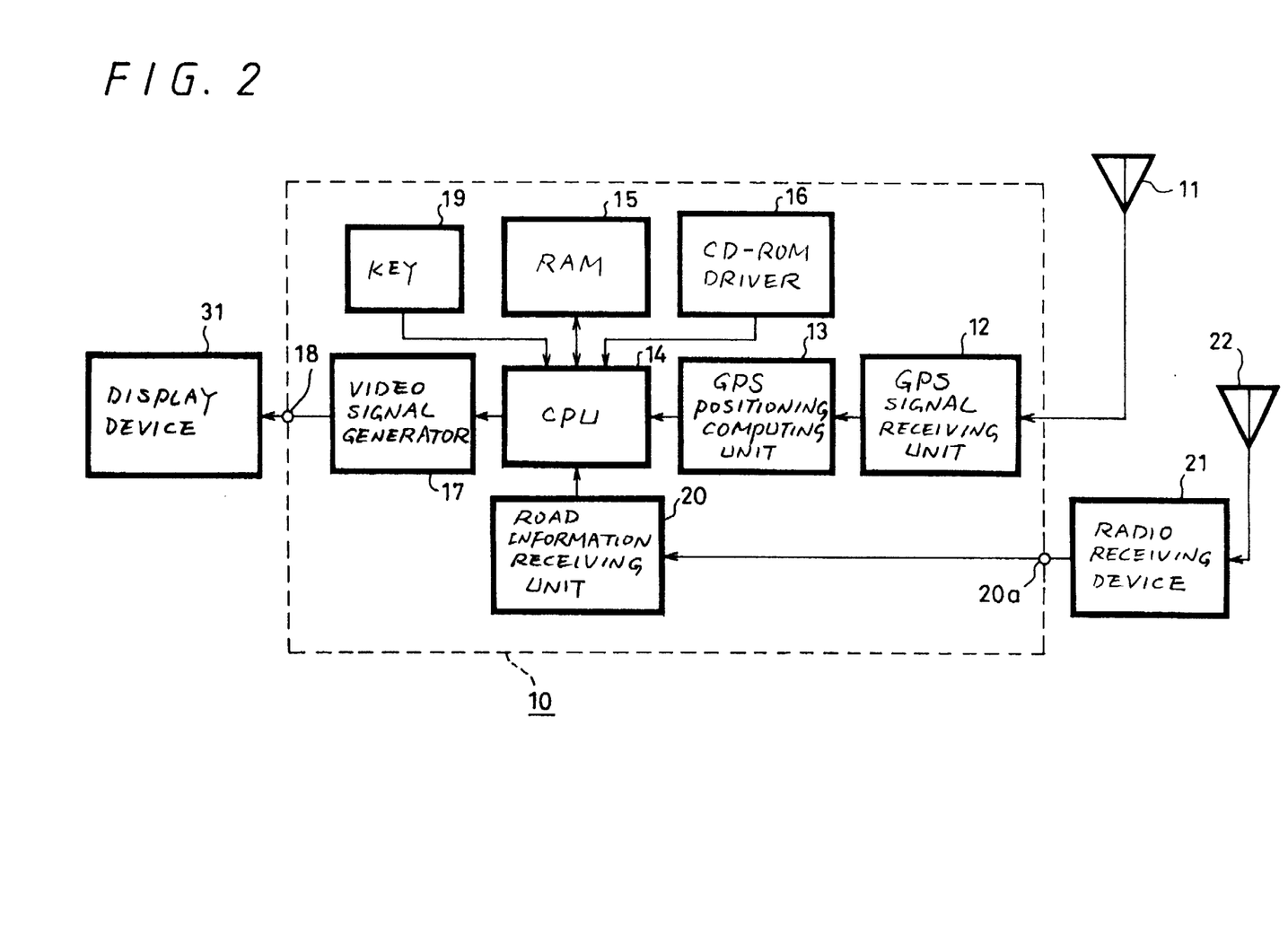
FIG. 2 is a block diagram showing an overall arrangement of a navigation apparatus according to the present invention.

FIG. 2 shows, in block form, an overall arrangement of a navigation apparatus according to the present invention. In this embodiment, a navigation apparatus 10 is mounted on a car A shown in FIG. 3.

As shown in FIG. 2, the navigation apparatus 10 includes a GPS antenna 11 for receiving a positioning signal transmitted from a GPS satellite (not shown). The positioning signal received at the GPS antenna 11 is received and processed by a GPS signal receiving unit 12, whereafter received data is supplied to a GPS positioning computing unit 13. The GPS positioning computing unit 13 computes present coordinate position and altitude by analyzing received data supplied thereto from the GPS signal receiving unit 12. Also, the GPS positioning computing unit 13 computes a speed and a direction at and in which the car with the navigation apparatus 10 mounted thereon is running. The present coordinate position data are latitude data and longitude which are absolute position information.

Various data such as present coordinate position computed by the GPS positioning computing unit 13 are supplied to a central control apparatus (hereinafter simply referred to as a "CPU (central processing unit)" 14 which controls a positioning operation of the navigation apparatus 10. The CPU 14 is connected with a RAM (random-access memory), and a CD-ROM driver 16. A CD-ROM (optical disk) with road map data stored therein is set on the CD-ROM driver 16, and data is reproduced from the CD-ROM by the CD-ROM driver 16 under control of the CPU 14.

The CD-ROM according to the present invention stores therein road data for displaying detailed road maps of various places as vector data for each road, and also stores therein principal road network information composed of data indicative of a freeway, national highway and prefectural highway, etc., in addition to these road data. The principal road network information will be described in detail later on.

When the GPS positioning computing unit 13 calculates the present position coordinate data, data indicative of a road map showing a position near the coordinate position is read out from the CD-ROM by the CD-ROM driver 16 under control of the CPU 14, and road map data thus read is stored in the RAM 15. Then, the CPU 14 reads out road map data of a scope to be displayed from the road map data stored in the RAM 15, and supplies the thus read out road map data to a video signal generator 17. The video signal generator 17 generates a video signal that is used to display a road map as a picture. This video signal is outputted from an output terminal 18. This video signal for displaying a picture of a road map is able to display various data such as symbols indicating present position, route to go, present speed and running direction together with the road map in the form of characters and graphics.

The video signal outputted from the output terminal 18 is supplied to a display device 31, and the display device 31 receives and reproduces a picture based on the video signal supplied thereto. Therefore, the road map and other information are displayed on a display panel of the display device 31.

The display device 31 can display not only the road map near the present position but also the road map of a position instructed to the CPU 14 by the driver when the driver operates operation key 19 under control of the CPU 14.

The navigation apparatus 10 according to the present invention includes a road information receiving unit 20 for receiving real-time road information supplied thereto from the outside. Road information applied to a road data input terminal 20a is received at and processed by the road information receiving unit 20, and the road information thus processed is supplied to the CPU 14. A radio receiving device 21 such as a portable telephone or a receiver for receiving light beacon, radio wave beacon or FM multiplexed broadcast is connected to the road information input terminal 20a. When road information is obtained via radio waves or the like received at an antenna 22 of the radio receiving device 21, such obtained road information is supplied to the CPU 14 through the road information receiving unit 20.

As the real-time road information obtained from the radio receiving device 21, there is kaleidoscopic change information, such as traffic jam information, traffic control information due to road construction or a necessary time between major points.

The CPU 14 in the navigation apparatus 10 according to the present invention calculates a route to a destination set based on operation of the operation key 19. In this case, a start point is a present position or a set start point. At that time, the CPU 14 calculates a proper route based on road information indicated by the principal road network information (i.e., route which passes roads indicated by the principal road network information). When road information is supplied to the CPU 14 from the road information receiving unit 20, considering a present traffic jam situation indicated by this road information, the CPU 14 calculates a route such that the distance and time taken in traveling become shortest.

The data thus calculated concerning the route to the destination is supplied to the video signal generator 17 in such a manner that the video signal generated from the video signal generator 17 may contain the route data. Thus, a route is displayed on a road map displayed on the display panel of the display device 30 by some suitable means, such as arrows.

Figure 3:
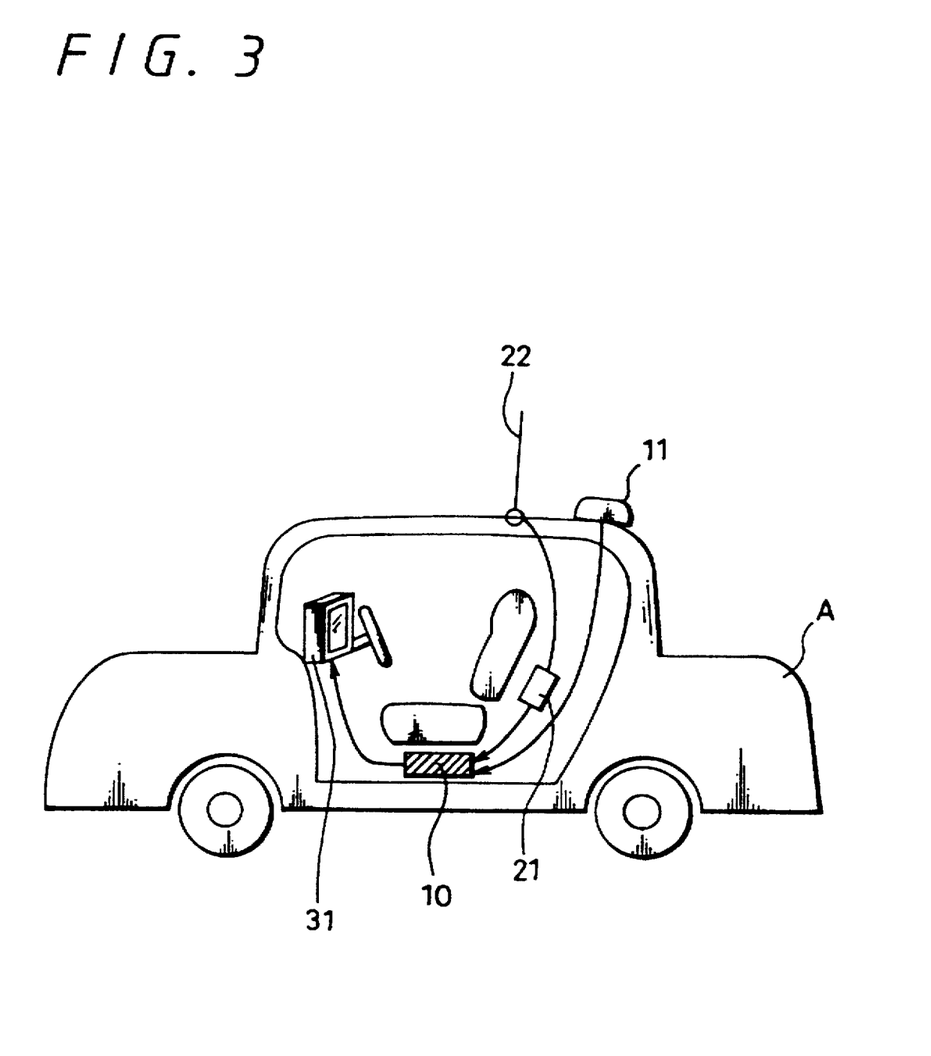
FIG. 3 is a schematic diagram of a car according to the present invention.

When this navigation system according to the present invention is in use, as shown in FIG. 3, the GPS antenna 11 and the antenna 22 are attached on the roof of the car A, and connected to the navigation apparatus 10 through the radio receiving device 21. The display device 31 is generally attached to a suitable position mounted near the instrument panel of the car A.

The principal road network data stored in the CD-ROM and which is used by the navigation apparatus 10 according to the present invention will be described next.

Figure 4:
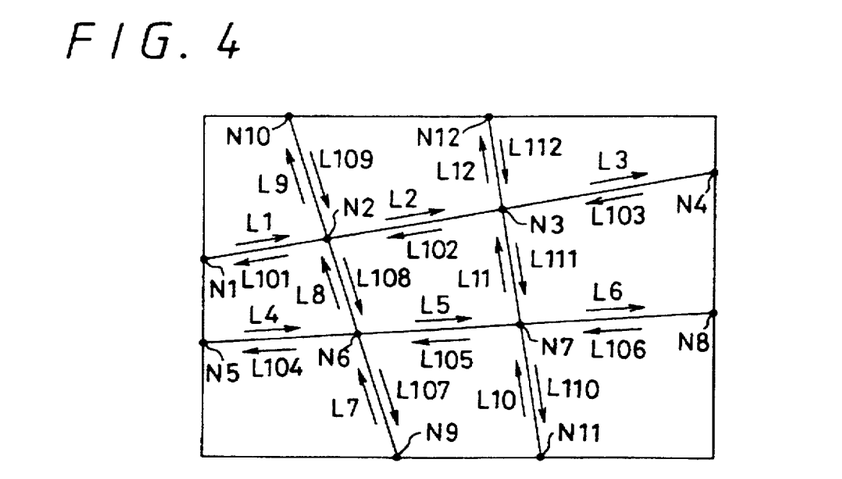
FIG. 4 is a schematic diagram showing examples of data of road network information according to the present invention.

Let it now be assumed that data shown in FIG. 4 is prepared as principal road network information of a certain area (block). Specifically, principal roads existing within this block are numbered at a predetermined interval as link Nos. L1, L2, ... Positions of the roads with the link Nos. L1, L2, .... are defined by nodes N1, N2, .... which indicate coordinate positions of a starting end and an ending end of each road. When a road is connected to other road by the node (i.e., there is a crossing), the driver is able to take a route on the road of the link No. connected thereto (except when a right-turn is restricted by traffic control information).

In this embodiment, when the driver travels on each road from one node to the other node or vice versa, different link numbers are set (in the case of one-way road, only the direction in which the driver can travel is indicated by the link number). Although each road is shown by a straight line in FIG. 4 for the sake of simplicity, in actual practice, vector data of road shape is indicated by shape data of road given to each link number, and each road is indicated by road data based on the shape of actual road.

A manner in which principal road network information is stored in the CD-ROM will be described in detail below.

Figure 5:
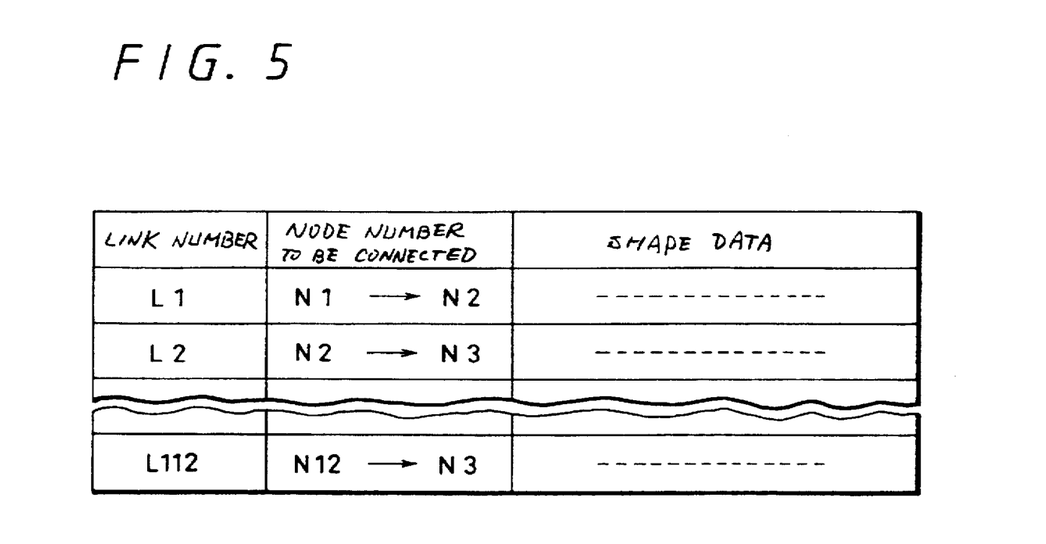
FIG. 5 is a diagram showing link data of road network information according to the present invention.
Figure 6:
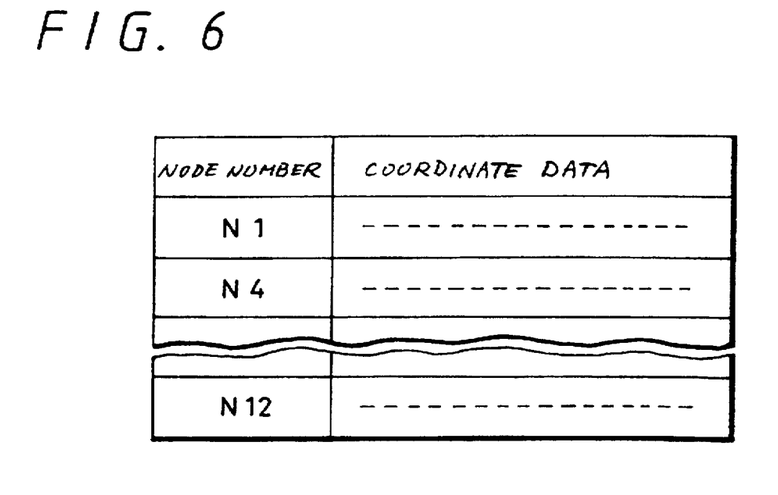
FIG. 6 is a diagram showing node data of road network information according to the present invention.

As shown in FIG. 5, data indicative of node numbers of the starting end and ending end of each link number are stored at every link numbers of all principal roads existing within each block, and shape data of roads connecting the node number also are stored in the CD-ROM. Moreover, as shown in FIG. 6, coordinate data of longitude and latitude of a position of each node number also are stored in the CD-ROM.

According to the present invention, the principal road network information is not limited to information concerning the above principal roads, and if each node is an intersecting point of complicated shape (crossing, interchange, etc.), then the principal road network information contains minor road link data as shape data of that crossing.

Figure 7:
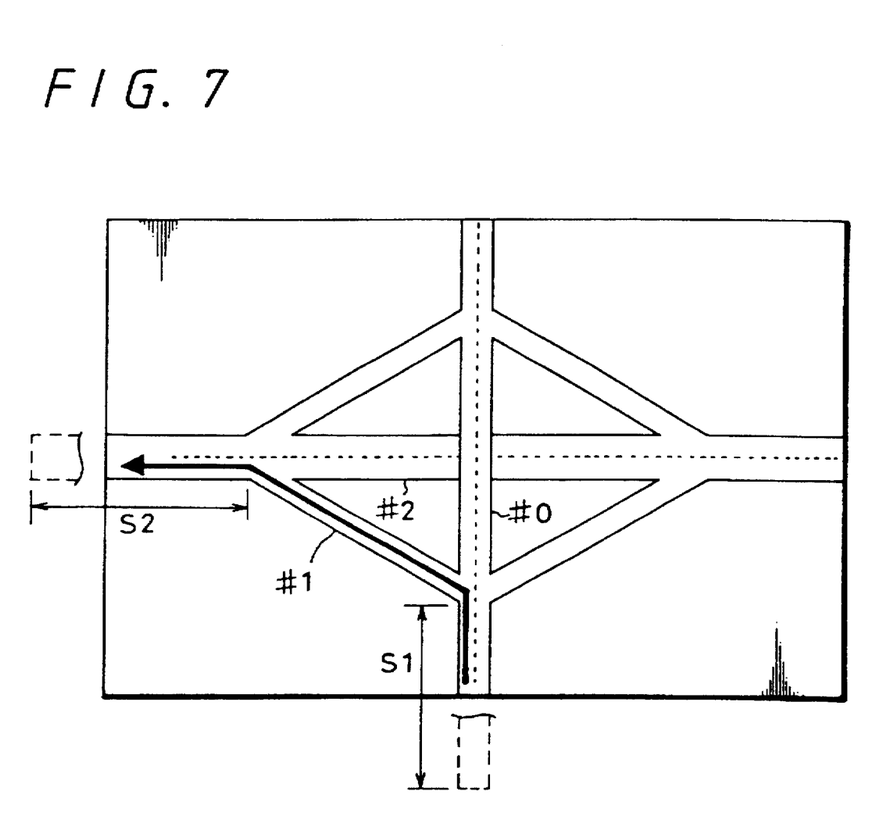
FIG. 7 is a schematic diagram showing minor road data according to the present invention.

If a certain crossing obtained by principal road network information is a multi-level crossing shown in FIG. 7 and the driver intends to travel from a road with a link number #0 to a road with a link number #2, then when the driver has to travel in a minor road with a link number #1, the road with the link number #1 is stored in the CD-ROM as minor road link data.

Figure 8:
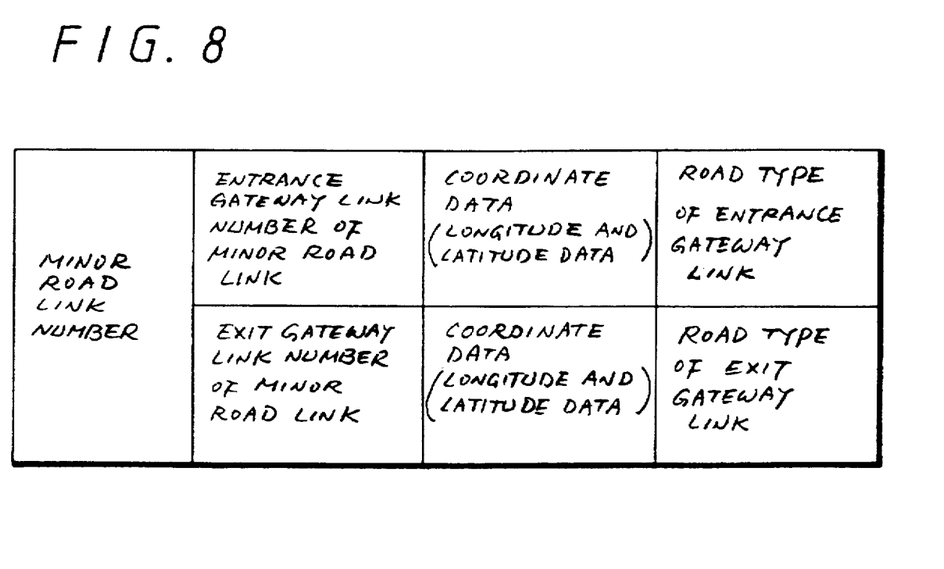
FIG. 8 is a diagram showing minor road link shape data of road network information according to the present invention.

As minor road link data, there are stored at every minor road link number a link number of road which become an entrance gateway of a minor road link, coordinate data of an entrance gateway based on longitude and latitude, road type (road type, such as freeway or national highway) of a road which becomes an entrance gateway, link number of road which becomes an exit gateway of a minor road link, coordinate data of such an exit gateway based on longitude and latitude, and type of road which becomes an exit gateway as shown in FIG. 8.

Figure 9:
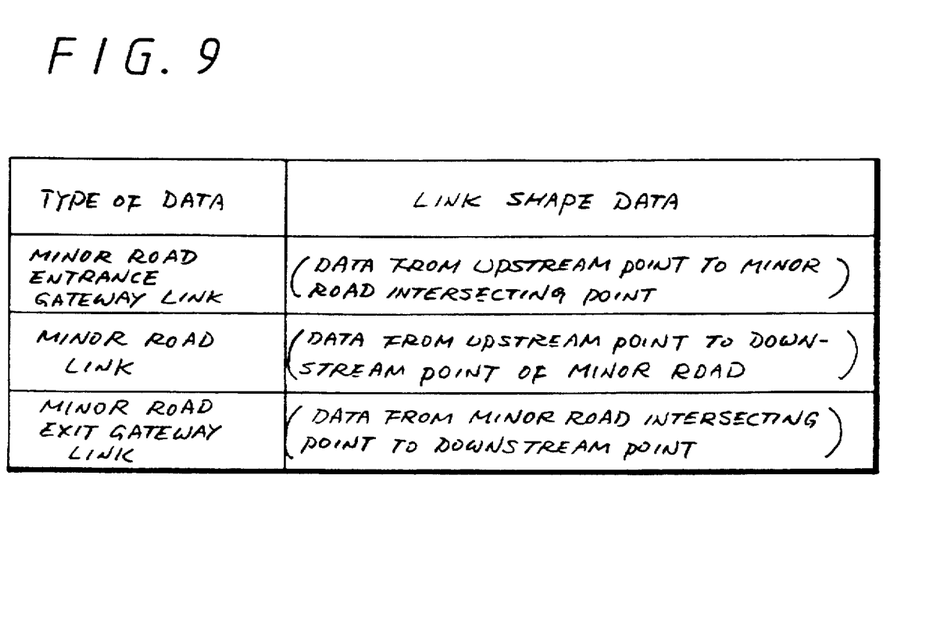
FIG. 9 is a diagram showing minor road link shape data of road network information according to the present invention.

Link shape data shown in FIG. 9 are added to minor road link data, and shape data of a minor road link may be three kinds of link data, i.e., minor road entrance gateway link data, minor road link data, minor road exit gateway link data. Data concerning a distance (S1 shown in FIG. 7) from a node of an upstream point (starting end) of a road which becomes an entrance gateway of minor road link to an intersecting point of minor roads is stored as the minor road entrance gateway link data. Vector data concerning shape of a minor road composing the minor road link is stored as the minor road link data, and data concerning a distance (S2 shown in FIG. 7) from an intersecting point of a road which becomes a minor road exit gateway of the minor road link to the node of a downstream (ending end) of this road is stored as the minor road exit gateway data.

Since there are provided minor road link data as described above, if the crossing or interchange composing each intersecting point has minor roads for changing a route to another road, then the navigation apparatus 10 obtains the minor road information. If the route calculated by the CPU 14 is displayed on the display panel of the display device 31, then a route for passing the minor road is displayed by using this minor road information.

A manner in which the route calculated by the CPU 14 is displayed on the road map will be described with reference to a flowchart of FIG. 10.

Figure 10:
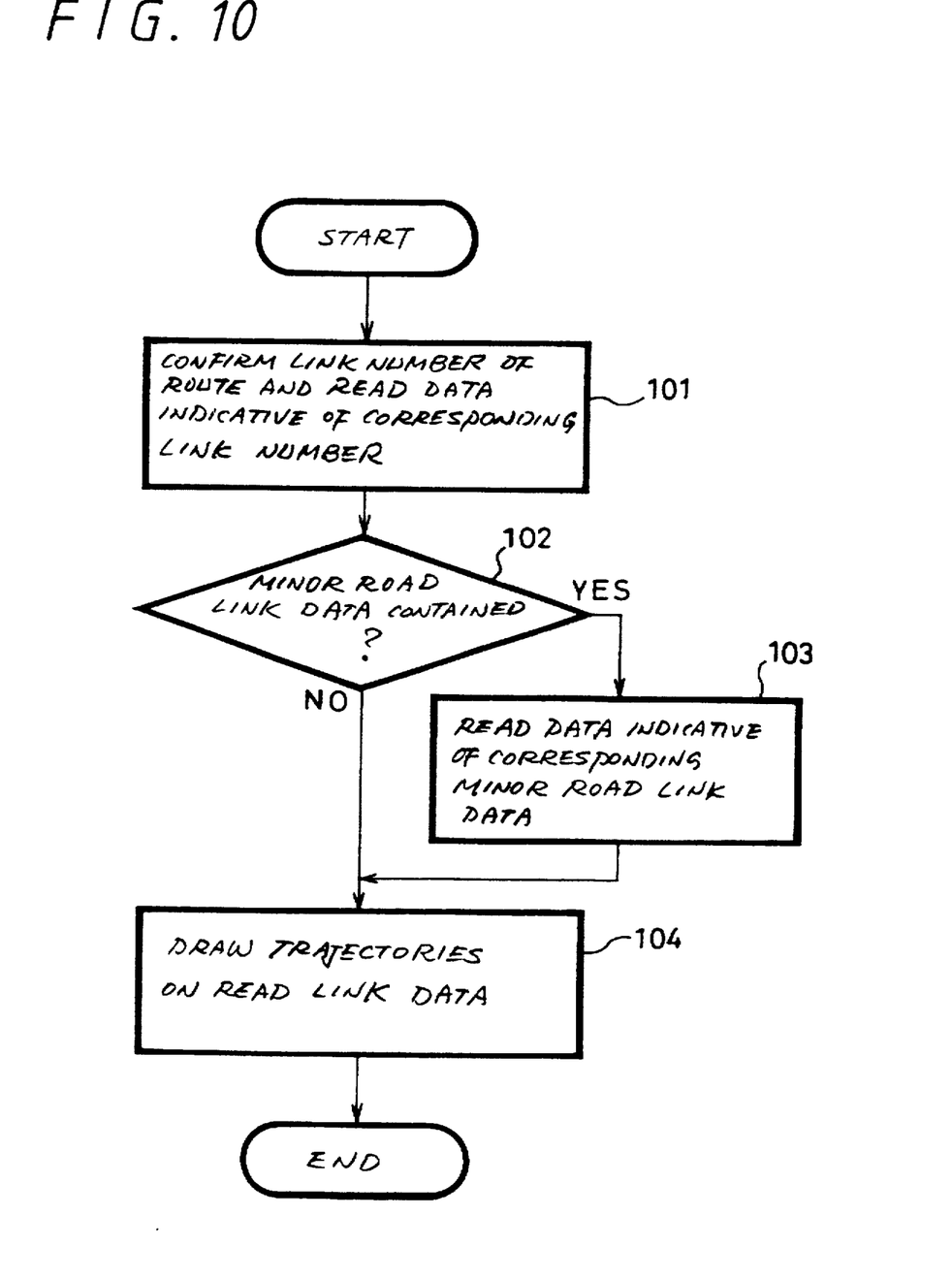
FIG. 10 is a flowchart used to explain a manner in which a route is displayed by the navigation apparatus according to the present invention.
Figure 11:
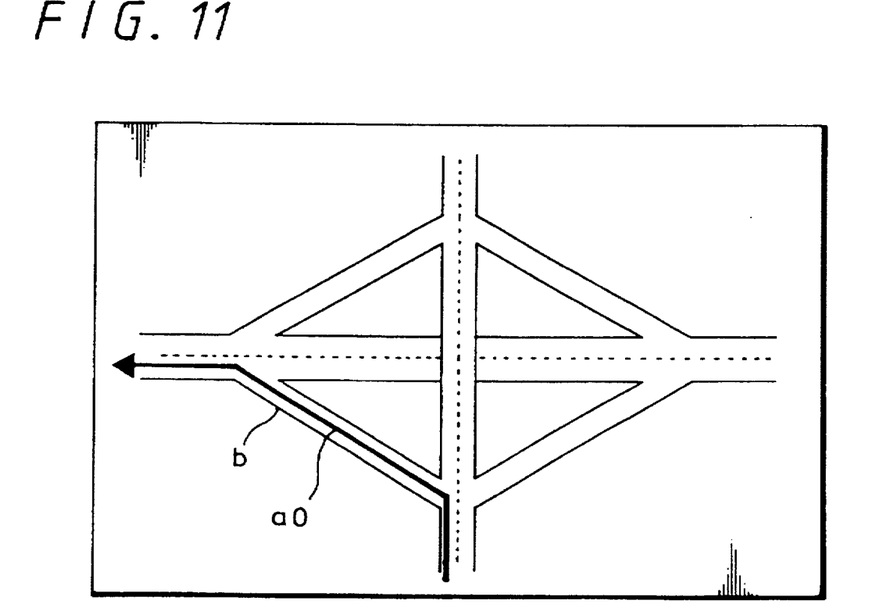
FIG. 11 is a schematic diagram showing an example in which a route to go is displayed by the navigation apparatus.

Referring to FIG. 10, following the start of operation, when a road in a certain block is displayed, the link number of a road which becomes a route within this block is confirmed, and data indicative of the road with such link number is read out from the CD-ROM at step 101. In the next decision step 102, it is determined whether or not the link number changing point (i.e., node) of read data of link numbers contains minor road link data.

If the minor road link data is contained in the link number changing point as represented by a YES at decision step 102, then the processing proceeds to the next step 103, whereat data indicative of the corresponding link number is read out from the CD-ROM. Then, the processing proceeds to step 104, whereat the read link number, the position indicated by the minor road link number and trajectory of road shape are drawn on a road map to be displayed, and the drawn trajectory is displayed on the display panel of the display device 31 as a route.

If on the other hand the minor road link data is not contained in the link number changing point (i.e., node) as represented by a NO at decision step 102, then the processing proceeds to step 104, whereat the read link number, the position indicated by the minor road link number and trajectory of road shape are drawn on the road map to be displayed, and the drawn trajectory is displayed on the display panel of the display device 31 as a route. Then, the processing is ended.

Since the route is displayed by use of the minor road link data as described above, when the route is changed at an intersecting point of a complicated shape with minor roads, such as multi-level crossing, interchange in freeway or slit roads, the route is displayed in such a manner that the course is routed following the minor roads. Therefore, the route corresponding to the actual road shape can be displayed accurately, and the driver can drive a car satisfactorily.

In the present invention, when a route is displayed, data of slit roads are used. However, the present invention is not limited thereto, and if the course is routed after such route has been set, then when the present position detected by the positioning means such as GPS approaches near the entrance of the minor road which became the route, the driver may be warned by some suitable means such as sound in such a manner that the driver should make a left- or right-turn to the minor road.

While the present invention is applied to the navigation apparatus using the positioning system which is referred to as the GPS as described above, the principle of the present invention may, of course, be applied to navigation apparatus using other positioning system. Furthermore, since the present invention can be applied to a road map display apparatus without such positioning system, the present invention may be applied to personal computer with a software capable of displaying a road map on a picture screen of a monitor display together with a route.

According to the navigation apparatus of the present invention, when the driver passes the intersecting point, the driver can select the route based on shape data of an intersecting point of each road, and hence the route at the intersecting point can be instructed accurately.

Since the data concerning the minor road connecting one road to another road which cross each other at this intersecting point is used as the shape data of intersecting point of each road, the route following the minor roads provided near the crossing can be selected, and hence even a route at a large-scaled crossing can be instructed accurately.

Since the distance data concerning distance from the reference position of one road crossing another road at an intersecting point to the position at which the minor roads are branched, the shape data concerning the shape of minor data, and the distance data concerning the distance from the position at which another road crossing one road at an intersecting point and the minor road are connected to the reference position of another road are used as the data concerning minor roads, minor roads can be accurately understood as road data, and hence the minor road can be properly instructed at every running direction.

Since the navigation apparatus according to the present invention includes the display means which displays a road map in response to the video signal supplied thereto from the video signal generating means, the route on the crossing can be accurately instructed on the road map.

According to the display method of the present invention, since the display position of the symbol indicating the route is set by use of shape data at an intersecting point of roads, a route at an intersecting point of roads can be accurately displayed, and hence the route can be constantly displayed satisfactorily.

In this case, since the minor road data concerning the minor road connecting one road and another road which are connected at an intersecting point is used as the shape data of intersecting point of roads, when the driver makes a left- or right-turn at a relatively large crossing with minor roads connected thereto, a new route obtained when the route is changed can be accurately displayed along the minor road.

Furthermore, according to the car of the present invention, since the route at the crossing is accurately displayed, the driver can drive the car safely reliably.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A navigation apparatus for navigating a navigation object comprising:

road data memory means having road data and shape data including shape data of an intersecting point of an at least one road crossing;

map making means for making a map from said road data of said road data memory means;

route guide means for making a route for the navigation object to travel from said road data of said road data memory means; and positioning means for positioning a present position of the navigation object corresponding to said map of said map making means.

2. The navigation apparatus for navigating a navigation object as claimed in claim 1, wherein said shape data of at least one crossing are attached to said road data of said road data memory means.

3. The navigation apparatus for navigating a navigation object according to claim 1, further comprising display signal generating means for generating a display signal for displaying said map of said map making means, and wherein said route guide means makes said route based on said shape data of at least one crossing of said road data memory means.

4. The navigation apparatus for navigating a navigation object according to claim 3, further comprising display means for displaying said route based on said display signal.

5. A navigation apparatus for navigating the navigation object according to claim 4, further comprising sound making means for informing a user of a predetermined message by sound in case the present position goes into a predetermined scope of area.

6. The navigation apparatus for navigating a navigation object as claimed in claim 1, wherein said positioning means is a global positioning system.

7. The navigation apparatus for navigating a navigation object according to claim 1, further comprising receiving means for receiving information transmitted on electromagnetic waves.

8. A computer readable medium storing data for a computer for causing the computer to make an image of a map, comprising:

road data including several road positions; and shape data of a plurality of road crossings including shape data of intersecting points of said plurality of road crossings, wherein said shape data of said plurality of road crossings are attached to said road data.

9. A car comprising:

a body;

wheels attached to said body; and a navigation apparatus mounted on the car for navigating the car, said navigation apparatus including road data memory means having road data and shape data including shape data of an intersecting point of at least one road crossing, map making means for making a map from said road data of said road data memory means, route guide means for making a route for the car to travel, and positioning means for positioning a present position of the car corresponding to said map of said map making means.

10. A car comprising:

a body;

wheels attached to said body; and a navigation apparatus mounted to the car for navigating the car, said navigation apparatus including road data memory means having road data and shape data including shape data of an intersecting point of at least one road crossing, map making means for making a map from said road data of said road data memory means, route guide means for making a route for the car to travel based on said shape data of at least one crossing, positioning means for positioning a present position of the car corresponding to said map of said map making means, and display signal generating means for generating a display signal for displaying said map of said map making means.

11. A navigation method of navigating a navigation object comprising:

a road data reading step for reading road data and shape data including shape data of an intersecting point of a road crossing from a road data memory;

a map making step for making a map from said road data;

a route guiding step for making a route based on said shape data of the crossing;

a positioning step for positioning a present position of said navigation object corresponding to said map; and a display signal generating step for generating a display signal for displaying said map.

12. A road display signal generating apparatus for generating a signal for displaying a road comprising:

road data memory means having road data and shape data including shape data of an intersecting point of at least one road crossing;

map making means for making a map from said road data of said road data memory means; and route guide means for making a route corresponding to said map of said map making means.

13. A road display apparatus for displaying a road comprising:

road data memory means having road data and shape data including shape data of an intersecting point of at least one road crossing;

map making means for making a map from said road data of said road data memory means;

route guide means for making a route corresponding to said map of said map making means; and display means for displaying a map and a route made by said map making means and said route guide means, respectively.

14. A computer apparatus for generating a signal for displaying a road comprising:

road data memory means having road data and shape data including shape data of an intersecting point of at least one road crossing;

map making means for making a map from said road data of said road data memory means; and route guide means for making a route corresponding to said map of said map making means.

* * * * *